(12) United States Patent
Pedersen et al.

(10) Patent No.: US 7,243,210 B2
(45) Date of Patent: Jul. 10, 2007

(54) EXTRACTED-INDEX ADDRESSING OF BYTE-ADDRESSABLE MEMORIES

(75) Inventors: Ronny Pedersen, Trondheim (NO); Erik K. Renno, Trondheim (NO); Oyvind Strom, Trondheim (NO)

(73) Assignee: Atmel Corporation, San Jose, CA (US)

( * ) Notice: Subject to any disclaimer, the term of this patent is extended or adjusted under 35 U.S.C. 154(b) by 37 days.

(21) Appl. No.: 11/140,750

(22) Filed: May 31, 2005

(65) Prior Publication Data

US 2006/0271763 A1    Nov. 30, 2006

(51) Int. Cl.
*G06F 12/06* (2006.01)
(52) U.S. Cl. .................................... 711/220
(58) Field of Classification Search ............... 711/215, 711/220
See application file for complete search history.

(56) References Cited

U.S. PATENT DOCUMENTS

| 5,193,167 A | 3/1993 | Sites et al. ............... 395/425 |
|---|---|---|
| 5,367,705 A | 11/1994 | Sites et al. ............... 395/800 |
| 5,454,091 A | 9/1995 | Sites et al. ............... 395/413 |
| 5,509,129 A | 4/1996 | Guttag et al. ............. 395/375 |
| 5,778,423 A | 7/1998 | Sites et al. ............... 711/118 |
| 6,076,158 A | 6/2000 | Sites et al. ............... 712/230 |
| 6,112,293 A | 8/2000 | Witt ........................... 712/216 |
| 6,167,509 A | 12/2000 | Sites et al. ............... 712/237 |
| 6,378,060 B1 | 4/2002 | Hansen et al. ............ 712/32 |
| 6,662,292 B1 * | 12/2003 | Wilson ..................... 711/220 |

* cited by examiner

*Primary Examiner*—Kevin L. Ellis
(74) *Attorney, Agent, or Firm*—Schneck & Schneck; Thomas Schneck; Mark Protsik

(57) ABSTRACT

A microprocessor circuit useful for indexed addressing of byte-addressable memories includes word-length index, base address, and destination registers designated by an instruction. The instruction also specifies one byte packed within the index register, which is to be extracted. A multiplexer has a word-wide input end accessing all of the bytes of the index register, and responsive to byte selection control passes the specified byte to its output. The extracted byte is provided directly at specific bit positions of a zero-extended address offset word. The offset word is added to the base address, the sum being used to address memory contents that are loaded into the destination register.

12 Claims, 1 Drawing Sheet

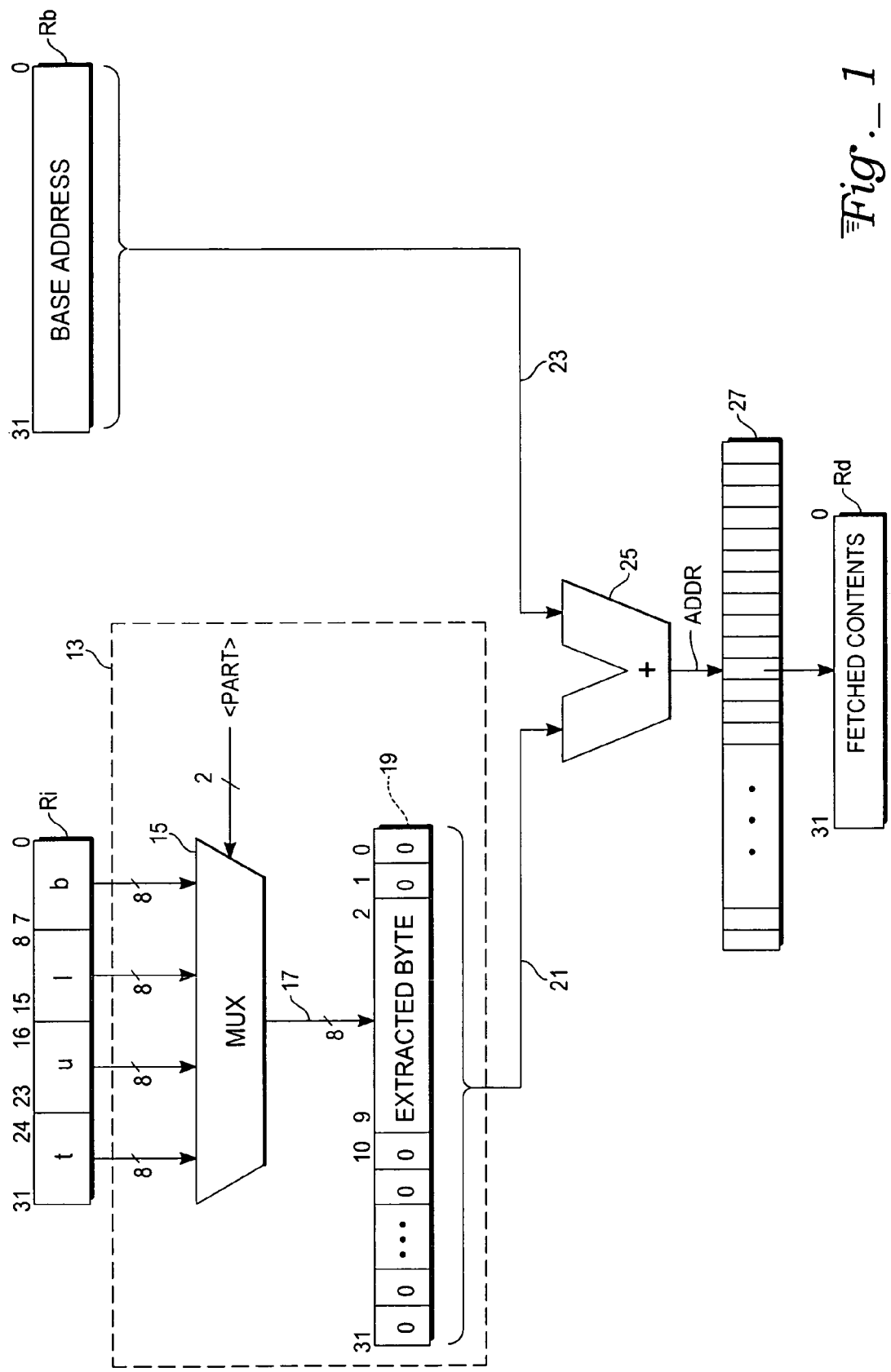
Fig._1

EXTRACTED-INDEX ADDRESSING OF BYTE-ADDRESSABLE MEMORIES

TECHNICAL FIELD

The invention relates generally to memory accesses in microprocessor architectures, including both load-store (RISC machine) architectures and memory-oriented (CISC machine) architectures. The invention relates more particularly to those index addressing schemes that permit a microprocessor to access memory structures, especially byte-addressable memories, more efficiently.

BACKGROUND ART

Operations involving two operands, where one of the operands is a byte value and the other operand is a known constant value are often feasible to compute with a look-up table, since there are only 256 ($=2^8$) possible byte values and corresponding outcomes, so the look-up table will be rather small. For computationally intensive operations (e.g., division, exponentiation), accessing look-up tables tend to be much faster than full hardware or software execution of the same operation. If the processor architecture supports memory loads with register-indexed offsets, the lookup can easily be performed in one RISC instruction.

On machines where the word length (e.g., 32 bits) is a multiple of the byte length (8 bits), several (e.g., 4) bytes can be packed into a single word, thus saving potentially valuable memory space in those applications where memory is limited. This byte-packing scheme can be applied both to a processor's own internal registers and to the memory that a processor accesses. However, where packed bytes are to be used for performing a table lookup, extracting the desired byte will normally require that a series of extra instructions be executed, which reduces efficiency.

Encryption and decryption operations are becoming increasingly important in modern microprocessor applications. Encryption and decryption algorithms may be quite computationally intensive. Such algorithms are frequently used in portable or embedded applications where computing power is limited. Among the more popular block-cipher algorithms are Blowfish, Triple-DES and Rijndael.

All of these algorithms use a special array addressing operation, which requires a long instruction sequence to execute on current microprocessors. The operation is as follows:

$$\text{result} = \text{pointer0 } [\text{offset0} \gg 24] \quad (1)$$
$$\wedge \text{ pointer1 } [(\text{offset1} \gg 16) \text{ \& 0xff}]$$
$$\wedge \text{ pointer2 } [(\text{offset2} \gg 8) \text{ \& 0xff}]$$
$$\wedge \text{ pointer3 } [\text{offset3 \& 0xff}];$$

Four memory access operations involving packed look-up tables are dominant here. Each of these operations extracts one of the four bytes in a 32-bit word, zero extends the extracted byte and then adds it to a base pointer. The result of this indexing operation generates the memory address to be accessed. A significant speed-up of the encryption and decryption process can be achieved if this array access is performed faster.

It is therefore desirable to make the memory access represented by operation (1) more efficient, such that the encryption and decryption application will thereby run faster and with greater power efficiency compared to present implementations of these algorithms.

SUMMARY

The present invention describes a microprocessor circuit responsive to an instruction for efficiently addressing memory and loading data from the resulting memory location into a register file. For example, a simple "load word with extracted index" instruction causes the circuit to extract a specified byte from an index register Ri, and to create a zero-extended word in which the extracted byte is located at bit positions [9:2], which corresponds to the effect of shifting of the extracted byte two bits to the left from its rightmost position. This combined extraction operation may be accomplished in an exemplary implementation of the circuit by using a multiplexer that is coupled to receive each of the index register's bytes, and is controlled by a byte selection value. The selected byte from the multiplexer's output is loaded directly (without any shifting operations) at the desired bit positions either into a displacement register (optional or directly into an input of an adder). The resulting word forms an offset value that is then added to the contents of a base address register Rb to form a memory address. The memory contents at that address are then fetched and loaded into a target destination register Rd. This instruction is useful, interalia, for indexing tables.

BRIEF DESCRIPTION OF THE DRAWINGS

FIG. 1 is a block diagram of exemplary microprocessor circuitry (and accessed memory), including a byte-extraction and zero-extension unit coupled with registers, an adder and other blocks, for implementing the present invention.

DETAILED DESCRIPTION

With reference to FIG. 1, each of the registers Ri, Rb, and Rd is a wordlength register (e.g., of 32 bits). Of particular interest for the present invention is the extraction of a specified byte from the index register Ri. In the exemplary embodiment shown here, the index register Ri contains four bytes, labeled as a top byte t (bits 31 to 24 inclusive), an upper byte u (bits 23 to 16 inclusive), a lower byte l (bits 15 to 8 inclusive) and a bottom byte b (bits 7 to 0 inclusive). The parts {t,u,l,b} of the index register Ri may be identified in an instruction using two-bit byte numbers {3,2,1,0}. Which of the hardware registers in the microprocessor are designated as the index, base and destination registers Ri, Rb, and Rd may be separately identified in an instruction using register numbers, e.g., {0,1, ... , 15}.

An instruction may specify a byte from Ri to be extracted, zero-extended, and displaced to the left by a certain number of bits. In prior microprocessor circuitry, this zero-extended byte extraction is typically performed using a sequence of distinct steps involving successive bit shifts to the left and right by amounts depending upon the particular byte to be extracted and extended. For example, to extract the top byte t, the entire word-length contents of the index register Ri may be read into a temporary register and then shifted in the temporary register to the right by 24 bits. To extract the upper byte u, the entire contents of the index register Ri may be read into a temporary register, shifted to the left by 8 bits, then shifted to the right by 24 bits. To extract the lower byte l, the entire contents of the index register Ri may be read into a temporary register, shifted to the left by 16 bits, then shifted to the right by 24 bits. To extract the bottom byte b, the entire contents of the index register Ri may be read into a temporary register, shifted to the left by 24 bits and then to the right by 24 bits. Once extracted, the result is shifted again to the left by some amount of bits (e.g., by 2 bits for accessing byte-addressable memory) to obtain the address offset or displacement. Thus, the prior art performs a sequential set of shift operations in order to extract the desired byte from the index register and word align it before it can be used as an address offset or displacement for a load instruction.

In the present invention, the byte-extraction and zero-extension unit 13 obtains the address offset value directly in a single step. The unit 13 includes a multiplexer 15 that extracts the correct byte from the index register Ri. The multiplexer 15 has byte-wide inputs from each of the four byte locations (t, u, l, and b) of the index register Ri. The multiplexer 15 also has a two-bit selection control input, labeled <part> in FIG. 1, received from the microprocessor's instruction decoder, that causes the multiplexer 15 to select the desired byte (t, u, l, or b) and place it on its byte-wide output 17.

An address displacement register 19 (optional) may receive this multiplexer output 17 and be loaded with the selected byte directly at bit positions [9:2] of such register 19. These particular bit positions automatically provide a two-bit displacement of the selected byte, so that a separate two-bit left shift operation is not required to obtain the correct address offset for accessing byte-addressable memories. All other bit positions [31:10] and [1:0] of the offset value in register 19 contain zeros, thereby automatically providing a zero-extension. The word-length output 21 from the displacement register 19 forms the address-offset output of the byte-extraction and zero-extension unit 13.

Alternatively, the address displacement register 19 may be purely conceptual of the word-wide offset value 21, and the selected byte (t, u, l, or b) from the multiplexer 17 may be input directly into an adder 25 at the desired bit positions [9:2] of one adder input. The other bit positions [31:10] and [1:0] of this adder input are loaded with zeros to complete the zero-extended offset word 21 provided to the adder 25. In any case, the offset word is provided with the selected byte at specified bit positions (here, [9:2]) without having to resort to a sequence of shifting operations.

The offset value 21 is added to the base address 23 obtained from a base address register Rb. The output from adder 25 forms the memory address to be accessed from a memory 27. The contents at that address are fetched from memory 27 and placed in the destination register Rd. This concludes the extracted-index memory access operation, Rd←*(Rb+(Ri[part]<<2)).

This circuitry for supporting memory loads with register-indexed offsets is particularly useful in microprocessors that are expected to require frequent byte-sized table look-ups, e.g., processors specially adapted for implementing block cipher algorithms. Such algorithms typically act upon text message blocks in a series of rounds, where each round may comprise some specified sequence of permutations, substitutions, and combinations with round keys. Several of such cipher operations are best implemented using look-up tables. Extracted-index memory accesses supported by the present invention, enable these table look-ups to be executed efficiently in byte-packed memory structures, saving both valuable time and memory space.

Although the present invention has been described in terms of exemplary embodiments, a skilled artisan will recognize other related implementations that are also within the scope of the present invention. For example, other word sizes may be used than the exemplary 32-bit (i.e., 4-byte) words described herein. The bit positions into which the selected byte is loaded, given in the example above as [9:2] for accommodating byte-addressed memories, could be changed to correspond to different displacement values than 2. Other selection means than a multiplexer might be implemented, provided they avoid a multi-step sequence of shifts.

What is claimed is:

1. An circuit in a microprocessor responsive to an instruction for accessing memory using indexed addressing, the circuit comprising:

a set of word-length registers, including those specified as an index register, a base address register and a destination register, the index register configured to contain packed bytes to be separately extracted;

selection means for extracting a specified byte from the index register and for providing the specified byte directly as an offset word at specific bit positions that correspond to a left-shifted displacement of the specified byte; and means for adding the contents from the base address register with the offset word to obtain a sum as a memory address to be accessed, accessed memory contents at the memory address designated by said sum being loadable into the destination register.

2. A circuit in a microprocessor responsive to an instruction for accessing memory using indexed addressing, the circuit comprising:

a set of word-length registers, including those specified as an index register, a base address register and a destination register, the index register configured to contain packed bytes to be separately extracted;

a multiplexer having a word-length input end coupled to the index register and adapted to access each of the bytes packed within the index register, a byte-length output end, and a control input for receiving byte selection information, the multiplexer adapted to extract a selected one of the bytes received at its input end and pass only that selected byte to its output end; and an adder coupled to receive word-length contents from the base address register and also receive an offset word containing the selected byte from the multiplexer's output end at specific bit positions of the offset word, the adder adapted to supply an output sum of the received contents as a memory address to be accessed, the accessed memory contents at said memory address being loadable into the destination register.

3. The circuit as in claim 2, wherein the word-length is four byte-lengths, and the control input of the multiplexer is a two-bit input specifying one of four bytes to be extracted.

4. The circuit as in claim 2, wherein the specific bit positions of the offset word containing the selected byte from the multiplexer's output end are bit positions [9:2] corresponding to a two-bit left-shifted offset suitable far accessing byte-addressable memories.

5. The circuit as in claim 2, further comprising a word-length displacement register coupled to the byte-length output end of the multiplexer and adapted to load the selected byte at specific bit locations of the displacement register, contents output from the displacement register forming the offset word that is provided to the adder.

6. The circuit as in claim 5, wherein the displacement register is adapted to store zeros at all bit locations thereof other than the specific bit positions adapted to load the selected byte.

7. The circuit as in claim 2, wherein the adder is a component of a central processing unit in the microprocessor, rather than a separate component dedicated to indexed addressing.

8. A method executed by a microprocessor in response to an instruction to access memory using indexed addressing, the method comprising:
   specifying certain word-length registers as an index register, a base address register and a destination register, and specifying a byte packed within the index register to be extracted;
   extracting the specified byte from the index register using a multiplexer and providing the specified byte as specific bit positions of an offset word;
   adding word-length contents from the base address register with the offset word to obtain a sum as a memory address to be accessed; and
   accessing memory contents at said memory address and loading the accessed memory contents into the destination register.

9. The method as in claim 8, wherein the word-length is four byte-lengths, and the multiplexer is a two-bit control input specifying which one of the four bytes packed within the index register is extracted by the multiplexer.

10. The method as in claim 8, wherein the specific bit positions of the offset word that contain the specified byte are bit positions [9:2], corresponding to a two-bit left-shifted offset suitable for accessing byte-addressable memories.

11. The method as in claim 8, wherein the offset word contains zeros in all bit positions other than those specific positions that contain the specified byte.

12. The method as in claim 8, wherein the index register, base address register and destination register, and the specified byte of the index register, are all specified by a load word with extracted index instruction to which the microprocessor is responsive.

* * * * *